July 30, 1963 H. T. HODGES ET AL 3,099,208
PHOTOGRAPHIC COPIER
Filed May 3, 1960 3 Sheets-Sheet 1
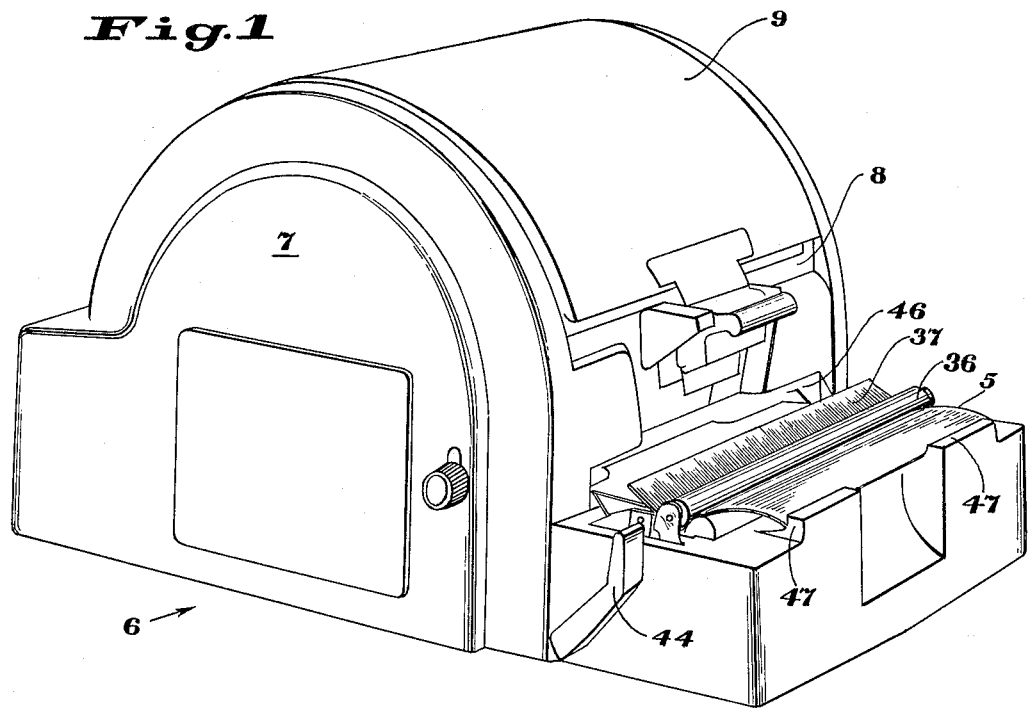
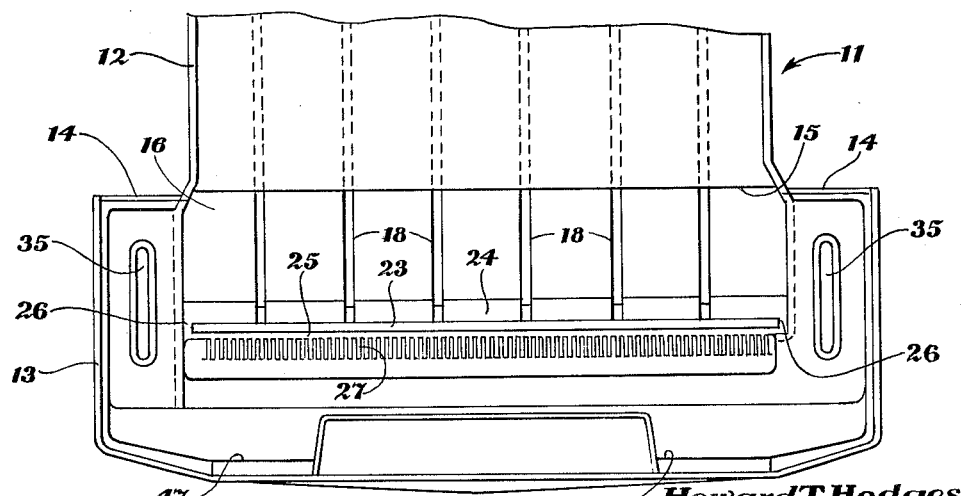
Howard T. Hodges
Carter J. Hughey
Robert J. Ernisse
INVENTORS
BY R. Frank Smith
Steve W. Grembow
ATTORNEYS

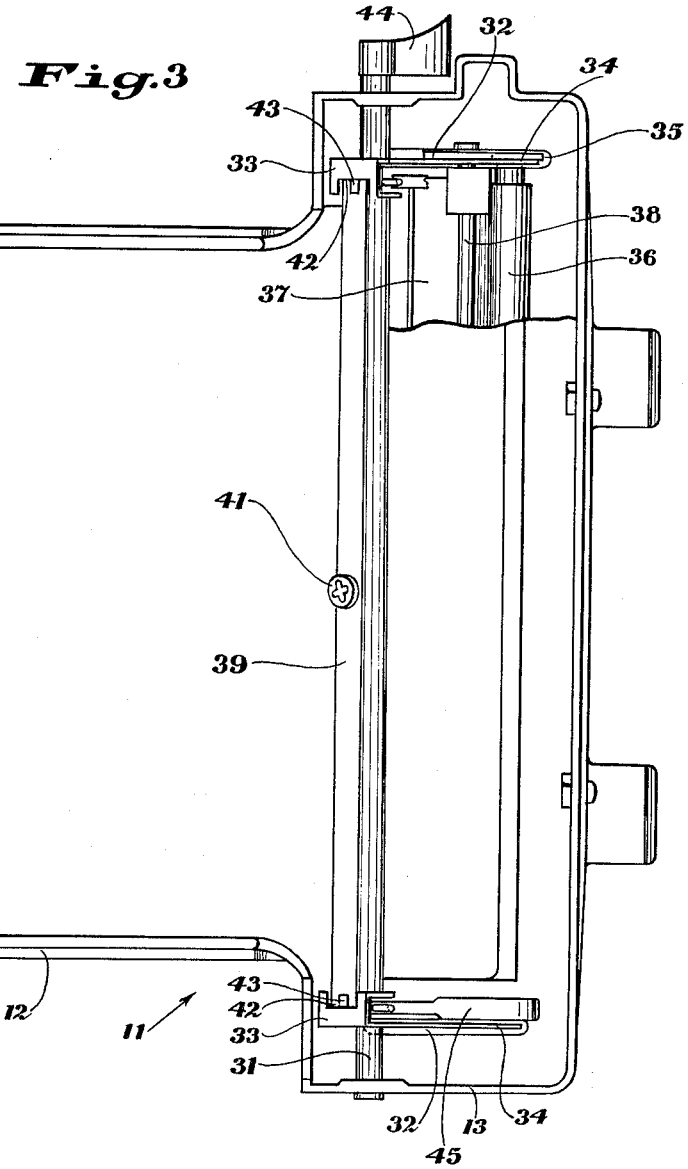

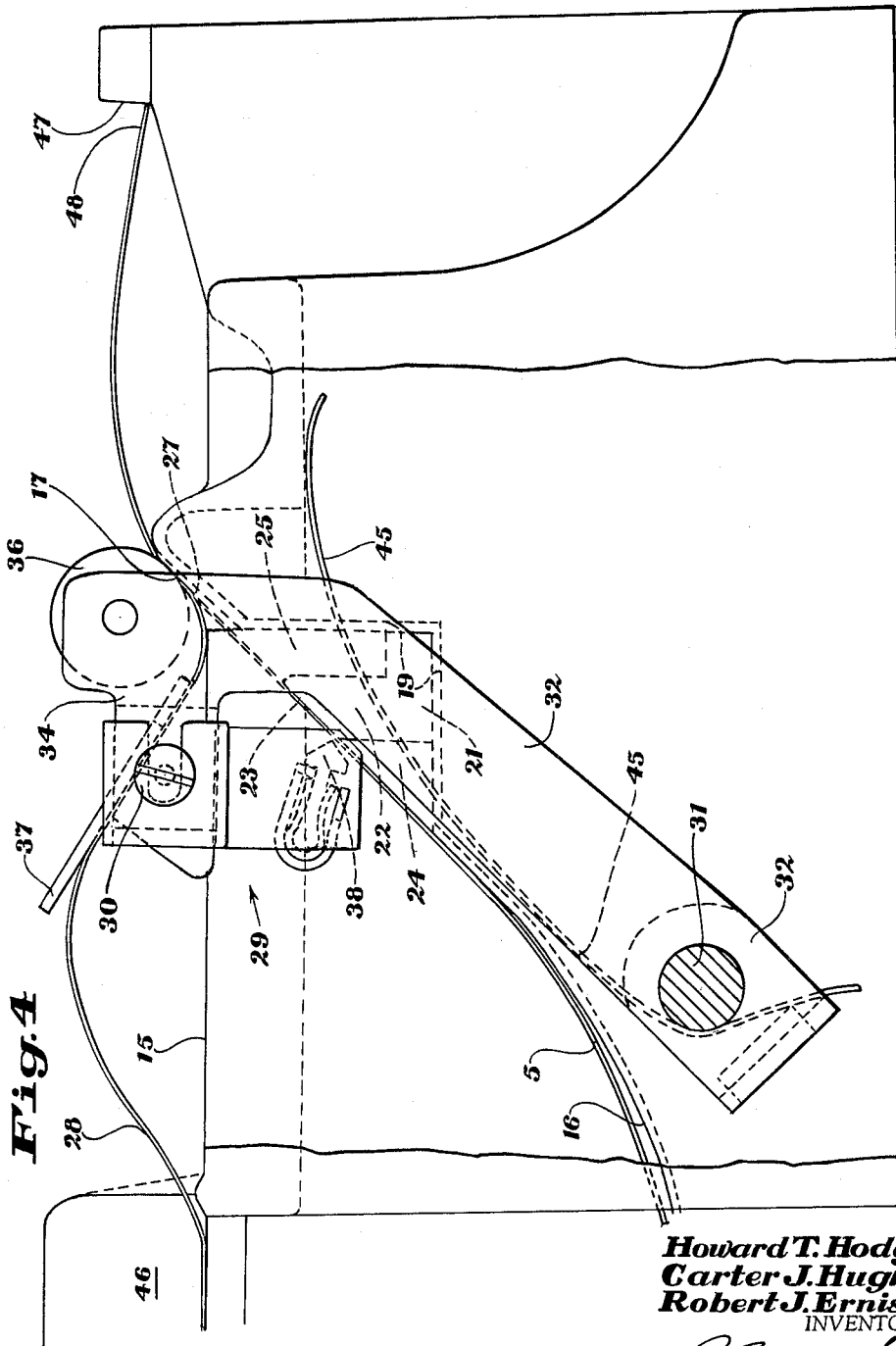

United States Patent Office 3,099,208
Patented July 30, 1963

3,099,208
PHOTOGRAPHIC COPIER
Howard T. Hodges, Carter J. Hughey, and Robert J. Ernisse, Rochester, N.Y., assignors to Eastman Kodak Company, Rochester, N.Y., a corporation of New Jersey
Filed May 3, 1960, Ser. No. 26,577
8 Claims. (Cl. 101—131)

This invention relates generally to photographic reproduction, and more specifically to an improved photographic copying apparatus.

Photographic processing and image-transfer copying devices for processing an exposed sensitized photographic sheet in a suitable liquid, and placing the sheet in intimate contact with a copy sheet which is nonsensitized to cause transfer of an image from the photographic sheet to the copy sheet are well known in the art. A device of this type is specifically disclosed in U.S. Patent No. 2,666,384. The principle upon which this type of apparatus operates is disclosed in U.S. Patent No. 2,596,756, in which a film or paper support coated with a substantially unhardened silver halide gelatin emulsion containing a pigment or dye and a tanning developing agent is exposed to a suitable two-tone subject, such as a line or half-tone subject, after which the sensitized film or paper is processed by immersion in an alkaline solution. This processing results in the developing of the exposed image, and the simultaneous hardening or tanning of the gelatin in the exposed and developed areas. Thereafter, the excess fluid may be squeegeed from the processed sheet which is then pressed, while still moist, into contact with a non-sensitized sheet of paper having an absorbent surface. After separation of the sheets, it will be found that a stratum of the unexposed and, therefore, unhardened area of emulsion layer will have been transferred to the sheet of paper. This process thus produces a direct positive image. Moreover, although the image is immediately discernible upon separation of the two sheets because of the pigment or dye in the transferred emulsion, this image will darken further upon exposure to light since the transferred emulsion also contains sensitized silver halide.

This process is especially useful since it permits making several reproductions from the exposure of a single sensitized sheet. This is possible because in the transfer of unhardened gelatin to the absorbent sheet, only a stratum thereof is carried over. The processed sheet may be again wetted in the alkaline solution, squeegeed and pressed against a second absorbent sheet whereby a second stratum of the unhardened gelatin will be transferred upon separation thereof. It is possible to repeat this a number of times before the unhardened gelatin is exhausted to the extent that acceptable copies are no longer obtainable.

Since the composition of the emulsion, as well as a number of modifications thereof, and the chemistry of this process are fully disclosed in the above-noted patents and actually form no part of the present invention, we have omitted such data in the specification. We refer to this process, however, in that the apparatus disclosed below, which comprises the present invention, is particularly adapted for use in this process and in such variations thereof as may occur to those skilled in this art.

Photographic processing and image-transfer devices of the type described provide only the basic essentials for transferring an image from a matrix master to a non-sensitized image-receiving copy sheet; namely, a tray containing activator solution into which the exposed matrix is inserted and developed, a separate container for holding and positioning the copy paper, and a simple manually operable mechanism for squeegeeing the excess solution from the matrix and immediately thereafter pressing the matrix into intimate contact with the image-receiving copy sheet. As indicated earlier, the matrix used in transfer devices of the type described is coated with a substantially unhardened silver halide gelatin emulsion except for an approximately two-inch tab portion of the matrix which is left uncoated. The uncoated tab portion is provided because in this type of device it is necessary for the operator to insert the exposed matrix into the activator tray, and the tab portion which is grasped by the operator does not enter the processing solution. The operator then advances a sheet of copy paper until it is aligned with the front edge of the matrix, an operating handle is lowered urging a pressure roller into engagement with the matrix-copy paper sandwich which is then pulled past the roller. After stripping the copy paper from the matrix, it is necessary for the operator to trim off that portion of the copy paper which overlaps the matrix tab to produce the final copy. The tab is necessary since a portion of the matrix and the copy sheet are kept out of the activator solution to facilitate handling of the matrix and copy paper by the operator.

One objectionable feature of the above-described copying apparatus is that it is extremely wasteful of copy paper; requiring that each sheet of copy paper be approximately two-inches longer than is necessary. This copying system is further objectionable in that the necessity for trimming off the tab portion of the copy paper to produce the final copy is time-consuming and inconvenient. A further disadvantage of this type of copying apparatus is that the manually operable mechanism for pressing the copy sheet into engagement with the matrix and squeegeeing the excess solution therefrom is spring-biased out of engagement with the ramp of the processing tray, thereby uncovering and exposing the processing solution in the tray to the operator and others in the vicinity of the apparatus. This is objectionable because it permits inadvertent and accidental physical contact with the processing solution which can be extremely messy and inconvenient.

It is therefore one of the primary objects of this invention to provide an improved processing and image-transfer copying apparatus that eliminates the need for an approximately two-inch tab portion added onto the copy paper.

One more object of this invention is to provide an improved processing and image-transfer apparatus in which the copy sheets used therein have the same dimensions as the original to which the matrix is exposed, thereby making it unnecessary to trim off a tab from the copy sheet in order to produce the final copy.

Still another object of this invention is to provide an improved photographic copying apparatus having means for covering the entrance to the activator tray thereby preventing inadvertent or accidental physical contact with the processing solution by the operator or others.

An additional object of this invention is to provide an improved photographic copying apparatus having an improved ramp design for the activator tray resulting in drier copy sheets.

A still further object of this invention is to provide an improved photographic copying apparatus of simple design and construction, thoroughly reliable and efficient in operation, and economical to manufacture.

Objects and advantages other than those set forth above will be apparent from the following description when read in connection with the accompanying drawings, in which:

FIG. 1 is a perspective view showing an improved processing and image-transfer copying apparatus in which a preferred embodiment of the present invention is incorporated;

FIG. 2 is a segmental top plan view of the activator tray showing the improved ramp with the pressure roller and squeegee mechanism omitted for purposes of clarity;

FIG. 3 is a segmental bottom view of the tray with a portion thereof broken away showing the mechanism for processing the copy sheet into contact with the matrix and squeegeeing the excess solution therefrom; and FIG. 4 is an enlarged segmental side elevation view with a portion thereof broken away showing the normal position of the copying apparatus, matrix and copy sheet with the operator about to make a copy from the matrix.

A preferred embodiment of this invention is disclosed in the drawings and generally comprises a photographic copying apparatus 6 having a printing house 7 provided with a semicylindrical glass platen or support 8 and a corresponding hinged platen 9. As is well known in the art, the operator places the original which is to be copied in contact with a sensitized sheet or matrix 5, and places the original-matrix sandwich on glass support 8. The platen 9 is then closed and the printing lamps, not shown, in housing actuated for exposing matrix 5 for a predetermined time.

A tray 11 for holding the processing solution comprises a substantially T-shaped rectangular box having one portion 12 insertable into printer housing 7 and an enlarged end portion 13 forming shoulders 14 which butt up against printer housing 7 to form a stop means for tray 11. The tray 11 is slidably connected to housing 7 in the position shown in FIG. 1. The tray 11 is provided with a single elongated opening 15 in the end portion 13 thereof as best seen in FIG. 2, and the bottom 16 of tray 11 is curved upwardly merging with one edge of opening 15 of end portion 13 to form a ramp 17, as best seen in FIGS. 2 and 4. The bottom 16 of tray 11 has spaced ribs 18 for minimizing contact between tray 11 and matrix 5. The ramp 17 is provided with a right-angle depression 19, which acts as a trough and in which an L-shaped bar 21, one leg 22 of which has a beveled surface 23 is disposed and secured to tray 11 to provide spaced-apart grooves 24, 25 separated by leg 22. The bar 21 does not extend across the length of depression 19 thereby providing end passages 26 through which groove 25 drains to tray 11. The top part of ramp 17 is provided with serrations 27, as best seen in FIG. 2, to break up any moisture bead which might accumulate and to allow better drainback of the processing solution into groove 25.

A mechanism 29 for pressing a copy sheet 28 into engagement with matrix 5 and for squeegeeing the excess solution therefrom comprises a shaft 31 rotatably carried by end portion 13 of tray 11 as best seen in FIG. 4. A pair of identical arms 32 are provided, as best seen in FIGS. 3 and 4, each having a U-shaped end 33 loosely mounted for rotation on one end of shaft 31. Each arm 32 extends through a slot 35, seen best in FIG. 2, in end portion 13 of tray 11 and has a bracket 34 secured thereto by screw 30 for supporting one of the ends of a pressure roller 36, deflector plate 37 and squeegee 38. The shaft 31 is connected to arms 32 by an elongated flat spring 39 which is secured to shaft 31 at its center by a screw 41, and each end thereof extends into a slot 42 in U-shaped end 33 of arm 32. A lip 43 is struck out at each end of plate 39 and is adapted to engage the inner face of U-shaped end portion 33 to provide a holding means for preventing the end of plate 39 from becoming disengaged from U-shaped end portion 33. When shaft 31 is turned by a manually operable handle 44 secured to one end thereof, plate 39 is turned therewith by virtue of screw 41 causing the ends of plate 39 to turn arms 32 in the same direction. The plate 39 is resilient enough to provide a little play between the movement of shaft 31 and arms 32. A leaf spring 45 is provided for each arm 32 and has one end extending between shaft 31 and the bottom of U-shaped end portion 33 and engaging one edge thereof, and the opposite end bearing against the underside of tray 11, as best seen in FIG. 3. The springs 45 constantly urge arms 32 in a clockwise direction urging pressure roller 36 and squeegee 38 into engagement with ramp 17. The housing 7 has a paper holder 46 of any known type mounted above tray 11 for holding a supply of copy sheets 28. A copy sheet feeding mechanism of any known type, not shown, is provided which is normally manually operated for advancing the copy sheets 28 one at a time to an operative position. The front end of tray 11 further has stop shoulders 47 for matrix 5.

In the operation of this invention, the operator initially places the original, which is to be copied, into engagement with matrix 5 and then places the original-matrix sandwich on support 8 of the printer where it is exposed for a predetermined time. The operator then manually grasps handle 44 and moves it in a counterclockwise direction moving pressure roller 36 and squeegee 38 into an inoperative position withdrawing roller 36 and squeegee 38 from ramp 17 and permitting access to the processing solution in tray 11. The operator then grasps the exposed matrix 5 between his thumb and forefinger, separates matrix 5 from the original and inserts the matrix between roller 36 and ramp 17 into the processing solution in tray 11. After a suitable predetermined activation time, matrix 5 is withdrawn and positioned with the leading edge 48 of the tab portion of matrix 5 against stop shoulders 47 as best seen in FIG. 3. In this position, the lines of separation between the tab portion and the emulsion coating on matrix 5 is at the nip line where pressure roller 36 meets or engages matrix 5. The pressure roller 36 and squeegee 38 are then released and urged by springs 45 into engagement with matrix 5. The operator then manually advances a copy sheet 28 from holder 46, and the leading edge of copy sheet 28 is deflected downwardly by deflector 37 between roller 36 and matrix 5 on ramp 17, and to the nip line along which roller 36 engages matrix 5. In this position which is shown in FIG. 4, the leading edge of copy sheet 28 is in register with the line of separation between the tab portion and the emulsion coated portion of matrix 5. Slight overfeeding of the copy sheet 28 is desirable to create a slight buckle therein as shown in FIG. 4, tending to force the leading edge of copy sheet 28 tightly against the line of contact of roller 36 and matrix 5. The operator then grasps leading edge 48 of the tab portion of matrix 5 and withdraws matrix 5 out of the processing solution. As matrix 5 is withdrawn, copy sheet 28 is withdrawn along therewith and is urged into engagement with matrix 5 by pressure roller 36. As the copy sheet-matrix sandwich is being withdrawn from copying apparatus 6, squeegee 38 which is in engagement with beveled surface 23 squeegees the processing solution from matrix 5. The groove 24 in tray 11 below leg 22 permits the processing solution to be squeegeed off of both sides of matrix 5 thereby providing better squeegeeing of the bottom of matrix 5 which in turn effects a drier condition on ramp 17. If ramp 17 is not dry, pressure roller 36 will pick up moisture from it with each withdrawal of a matrix 5 and deposit it on the leading edge of copy sheet 28 during the succeeding transfer. To further increase the ramp dryness, the serrations 27 in ramp 17 in engagement with roller 36 break up any moisture bead which might accumulate and allows better drainback into groove 25. The solution that accumulates in groove 25 drains through end passages 26 back to tray 11 at a point below squeegee 38. The moisture condition on ramp 17 is considerably more critical in a copying apparatus of this type since there is no tab portion on copy sheet 28 to blot or dry pressure roller 36 as the copy sheet-matrix sandwich is withdrawn from copying apparatus 6.

The invention has been described in detail with particular reference to a preferred embodiment thereof, but it will be understood that variations and modifications can be effected within the spirit and scope of the invention, as described hereinabove and as defined in the appended claims.

We claim:
1. In a processing and image-transfer apparatus for developing the latent images of a matrix and transferring the developed image from the matrix onto an image-receiving sheet, the combination comprising: a processing fluid container having an opening through which an exposed matrix having sensitized and unsensitized portions may be inserted for development and withdrawn therefrom; support means on said container adjacent said opening for supporting a portion of said matrix; actuating means pivotally connected to the apparatus including a pressure roller and a squeegee and movable between a normal operative position in which said pressure roller and squeegee press said matrix against said support means, said pressure roller cooperating with said matrix in said operative position to provide a guide for directing an image-receiving sheet into the nip between said pressure roller and said matrix, and an inoperative position in which said pressure roller and squeegee are withdrawn from said support; resilient means for constantly urging said actuating means into said operative position; and stop means for limiting withdrawal of said matrix from said container and positioning said matrix so that said pressure roller in said operative position engages said matrix along a nip line coinciding with the line of separation of said sensitized and unsensitized portions, whereby when the leading edge of an image-receiving sheet of the same size as the said sensitized portion of said matrix is guided into said nip and said matrix is withdrawn from the apparatus, said pressure roller urges said image-receiving sheet and said matrix into intimate face to face contact for pressing the image of the matrix onto the image-receiving sheet whereby said image is transferred to said sheet upon separation of said sheet and matrix.

2. The invention according to claim 1 wherein said stop means comprises a shoulder against which the leading edge of the unsensitized portion abuts.

3. The invention according to claim 1 wherein said support means has a serrated portion against which said pressure roller bears when in said operative position.

4. The invention according to claim 3 wherein said serrated portion terminates in a drainage groove formed by said support means.

5. The invention according to claim 1 wherein said support means has a flat portion against which said squeegee bears in said operative position, and said support means forms a drainage groove below said flat portion.

6. The invention according to claim 1 wherein said support means has a serrated portion against which said pressure roller bears in said operative position, said support means further forming a right angle depression below said serrated portion, and an L-shaped bar is mounted in said depression and cooperates with said support means to provide first and second drainage grooves separated by a flat portion of said L-shaped bar against which said squeegee bears in said operative position.

7. The invention according to claim 6 wherein said first and second grooves are connected so that any drainage of processing solution is returned to said fluid container at a point below said squeegee.

8. In a method of transferring the latent image of an exposed matrix having sensitized and unsensitized portions onto an image-receiving sheet, the steps of: inserting an exposed matrix into a processing solution for development of the latent image on the sensitized portion thereof; applying a pressure to said matrix along a pressure zone extending across said matrix and in register with the line of separation between said sensitized and unsensitized portions; advancing the leading edge of an image-receiving sheet until it is in register and in engagement with said line of separation between said sensitized and unsensitized portions; grasping the unsensitized portion of said matrix and withdrawing it and said image-receiving sheet in superposed relation completely through said pressure zone where said matrix and image receiving sheet are urged into face to face contact for transferring the developed image from the matrix to said sheet; and then stripping said matrix and image-receiving sheet apart from one another to leave the developed image on said sheet.

References Cited in the file of this patent
UNITED STATES PATENTS

| | | |
|---|---|---|
| 1,378,879 | Lawlor | May 24, 1921 |
| 2,495,111 | Land | Jan. 17, 1950 |
| 2,666,384 | Yutzy et al. | Jan. 19, 1954 |
| 2,775,933 | Malone et al. | Jan. 1, 1957 |